No. 745,929. PATENTED DEC. 1, 1903.
R. THURY.
ELECTRIC DISTRIBUTING SYSTEM.
APPLICATION FILED JULY 25, 1903.
NO MODEL.
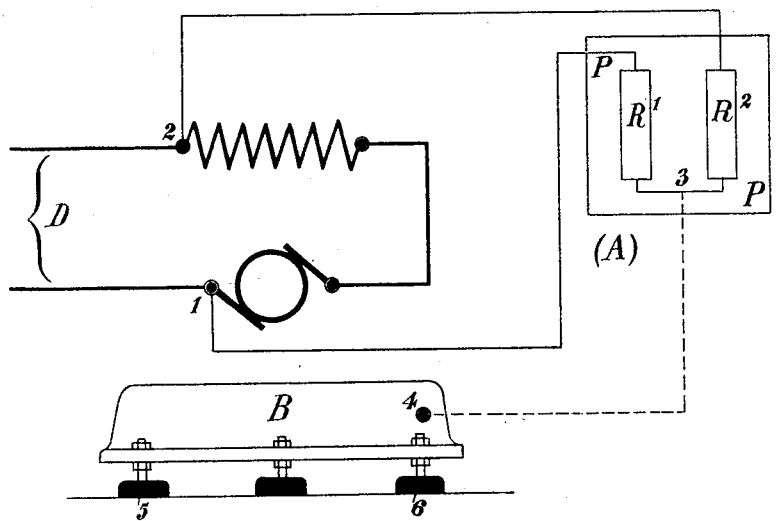
Witnesses
Chas. H. Smith
S. T. Haviland
Inventor
Rene Thury
for Harold Serrell
atty No. 745,929. Patented December 1, 1903.

UNITED STATES PATENT OFFICE.

RENÉ THURY, OF GENEVA, SWITZERLAND.

ELECTRIC DISTRIBUTING SYSTEM.

SPECIFICATION forming part of Letters Patent No. 745,929, dated December 1, 1903.

Application filed July 25, 1903. Serial No. 166,990. (No model.)

*To all whom it may concern:*

Be it known that I, RENÉ THURY, a citizen of the Republic of Switzerland, residing at Geneva, Switzerland, have invented an Improvement in Electric Distributing Systems, of which the following is a specification.

In electric systems for distributing the energy of several generators coupled in series and insulated from the ground some differences of tension greater than the normal tension for which the insulators have been designed often arise between the windings of the generators and their frameworks, bearings, and other metallic masses due to poor insulation of the line or of the apparatus.

The purpose of the present invention is to prevent under any circumstances whatsoever the establishment of a difference of tension between the high-tension circuits and the metallic masses of the apparatus and machines greater than the normal tension and also to keep the difference of tension during the normal working equal to the half of the normal tension. Granting that in the distribution of series systems in which the different machines and apparatus are carefully insulated from the ground it would only be necessary in practice to connect with the masses of the machines any part whatsoever of the electric circuit for preventing in any case a difference of tension higher than the tension produced or absorbed by the apparatus of which said masses are parts, still the result of such a disposition is to create a weak point in the insulation, which could easily result in some danger, particularly if the voltage is high. Therefore the connection between the metallic masses and the circuit must be made in such a manner that no danger can result from it. I have therefore combined a device which normally puts the masses of the machines to a potential equal to the half-tension only and having a sufficient resistance to prevent any one who might chance to be in communication with the masses and the circuit from receiving a dangerous shock.

This apparatus comprises two equal resistances mounted in series between the poles of the apparatus to be protected, the middle point of this system of two resistances being connected with the metallic masses. Said resistances may have a value about of one-hundredth of the resistances of the insulators which are interposed between the frame and the ground—that is to say, somewhat greater than one megohm—so that the current which flows through it would not exceed three milliamperes—for instance, in the case of a generator of three thousand volts. The usual metallic resistances may be used for this purpose, as well as resistances with a more or less conductive liquid or formed with metallic or metalloid powders.

The accompanying drawing shows diagrammatically my equalizing apparatus and the way in which it is connected with the machines or instruments to be protected.

D represents the electric circuit of a generator, and B the metallic frame of said generator. This frame is insulated from the ground by means of insulators 5 6, which may be of glass, porcelain, or other suitable material.

A is the equalizing apparatus comprising the present invention. It is composed of a protecting-support P P, on which are mounted the equal resistances $R'$ $R^2$. A point 3 of the circuit between the resistances is connected at 4 with the frame of the machine D, which machine is to be protected, and the two terminals 1 and 2 are connected, respectively, to the poles of the generator D. In this way the resistances $R'$ $R^2$ are connected in parallel between the winding and the masses of the machine. Consequently any static electrical charge of the winding has two ways for passing to the frame—that is, through either or both said resistances and through the wire connecting the neutral point 3 with the frame in the point 4—so that the resistance given to the equalizing-current is equal to one-quarter of the added resistances $R'$ $R^2$ and the difference of static tension is equal to one-half of the difference of tension existing between the terminals 1 and 2.

I claim as my invention—

In an electric distributing system, a device for limiting the differences of tension which may arise between the frames of the generators and other apparatus of the distributing system and the parts of said apparatus included in the circuits of the system, consisting of two resistances having a neutral point connected to the masses of the apparatus which are to be protected against high static charges, the said resistances being connected to the poles of the apparatus to be protected.

In testimony that I claim the foregoing as my invention I have signed my name in presence of two subscribing witnesses.

RENÉ THURY.

Witnesses:
G. T. MERTSHING,
P. H. MUNIERE.